United States Patent [19]

Sabatura

[11] Patent Number: 4,876,106
[45] Date of Patent: Oct. 24, 1989

[54] HIGHLY VERSATILE COMPREHENSIVE NUTRITIONAL COMPOSITION

[76] Inventor: Gail J. Sabatura, 38 Deanna Dr., Somerville, N.J. 08876

[21] Appl. No.: 126,388

[22] Filed: Nov. 30, 1987

Related U.S. Application Data

[63] Continuation-in-part of Ser. No. 833,832, Feb. 28, 1986, abandoned, which is a continuation-in-part of Ser. No. 713,735, Mar. 20, 1985, abandoned.

[51] Int. Cl.$^4$ .............................................. A23C 21/00
[52] U.S. Cl. .................................... 426/583; 426/588; 426/590; 426/656
[58] Field of Search ............... 426/656, 613, 593, 583, 426/590, 588

[56] References Cited

U.S. PATENT DOCUMENTS

| | | | |
|---|---|---|---|
| 3,978,245 | 8/1976 | Deininger | 426/613 X |
| 4,092,438 | 5/1978 | Tonner | 426/613 X |
| 4,242,364 | 12/1980 | Buddemeyer et al. | 426/613 X |
| 4,337,278 | 6/1982 | Brog | 426/583 |
| 4,362,761 | 12/1982 | Chang et al. | 426/583 X |
| 4,438,147 | 3/1984 | Hedrick, Jr. | 426/593 X |

FOREIGN PATENT DOCUMENTS

| | | | |
|---|---|---|---|
| 0688859 | 6/1964 | Canada | 426/613 |
| 0055763 | 5/1979 | Japan | 426/593 |

Primary Examiner—Donald E. Czaja
Assistant Examiner—Celine T. Callahan
Attorney, Agent, or Firm—Caesar, Rivise, Bernstein, Cohen & Pokotilow, Ltd.

[57] ABSTRACT

A highly versatile comprehensive nutritional system comprising a base mix and a flavoring. The base mix includes at least one protein containing ingredient and the flavoring includes at least one flavoring agent. The base mix and flavoring are brought together in the presence of a sufficient quantity of water just prior to use. In the preferred form the highly versatile comprehensive nutritional system is comprised of three proteins containing ingredients and also includes lecithin. The flavoring in the preferred form includes at least one flavor agent, such as source of chocolate flavor or a vegetable.

12 Claims, No Drawings

HIGHLY VERSATILE COMPREHENSIVE NUTRITIONAL COMPOSITION

CROSS-REFERENCE TO RELATED APPLICATIONS

This application is a continuation-in-part of application Ser. No. 06/833,832 filed Feb. 28, 1986 which in turn was a continuation-in-part of prior filed application Ser. No. 06/713,735, filed Mar. 20, 1985 both abn.

BACKGROUND OF THE INVENTION

This invention is for a highly versatile and unique food system that enables the building of a large variety of diverse foods by starting with a common base mix.

By virtue of the present invention, it is possible to bring together a common base mix with a particular flavoring and/or other ingredients to achieve such diverse foods as desserts, drinks, soup, vegetable and salad dressing.

The foregoing is achieved while at the same time producing a line of vastly differing products, which are not only of good taste, but which posses certain necessary physical characteristics such as ease of solubility and mixing together. The achievement of the foregoing required considerable effort and expense over a relatively long period of time.

In this invention each of the two food components are separately maintained until just prior to use. The first food component is referred to as the base mix and the second food component is referred to as the flavoring. Examples of foods produced by this invention include a chocolate shake or a corn soup.

One of the advantages of the present invention is the considerable flexibility that exists by having the separately maintained base mix and flavoring packets. This permits complete freedom in expanding the comprehensive nutritional system to other flavors or the addition of vitamins and minerals. Moreover, in some cases it is not practical to have the protein containing material in contact with the materials of the flavor packet or mix.

SUMMARY OF THE INVENTION

From the foregoing it can be seen that a particular food may be prepared in accordance with the highly versatile comprehensive nutritional system of the present invention by using base mix and one of the flavoring packets. Accordingly, the highly versatile comprehensive nutritional system of the present invention also assures food values including protein, carbohydrates and fat. Such products also have a pleasing taste and can be prepared in a relatively simple and quick manner.

In the highly versatile comprehensive nutritional system of this invention, the concept is to use the base mix together with a particular flavoring, depending upon the final food desired. For instance, if one desires a chocolate drink (hot or cold), shake, pudding or frozen fudge bar, the comprehensive nutritional system involves bringing together base mix and chocolate flavoring (provided in a packet), then adding a selected amount of water to the base mix and flavoring, followed by shaking, blending or stirring, including heating (optional) or freezing in the case of a solid product. Products of other textures, such as puddings and soups are also produced through the present invention.

DESCRIPTION OF PREFERRED EMBODIMENT

The base mix is of a neutral flavor which does not adversely affect the taste of the final product. In its preferred form the base mix has four constituents. In the first set of examples to be given, the weights of the four constituents will add up to 32.6165 grams which is the selected total solids weight for this first part of the nutritional system. The base mix has a food value of 120 calories and contains the following:
1. 26.0 grams RT-34 Instant (referred to RT-34)
2. 3.3 grams Alanate 230
3. 3.3 grams TMP 1220
4. 0.0165 grams Lecithin M-C-Thin Asol 436 (referred to Lecithin)

The RT-34 constituent is a whey protein concentrate (34% by weight protein) manufactured by Ridgeview of La Crosse, Wisc. The Alanate 230 is a calcium sodium caseinate product. The TMP 1220 is a calcium sodium total milk proteinate. Both Alanate 230 and TMP 1220 are manufactured by New Zealand Milk Products, Inc. of Petaluma, Calif. The Lecithin is in liquid form and is manufactured by Lucas Meyer Inc. It is used as a surfactant.

The first three constituents of the Base Mix are each comprised of significant amounts of protein. The RT-34 also adds bulk, particularly dry powder bulk. Both the Alanate 230 and the TMP 1220 are present for their protein values and also have a low flavor profile. Therefore these three ingredients do not significantly affect the taste of the final product.

The Alanate 230 adds viscosity as well as protein to the final product. The TMP 1220 adds protein, but has very little effect on viscosity.

While the Alanate and TMP are both characterized as a calcium sodium caseinate product, they are substantially different.

In the processing of skim milk to produce Alanate 230, a traditional acidification process is used to separate the whey from the remainder of the product. In the processing of skim milk to produce TMP 1220, the serum is removed in an acidification technique, with the balance of the product being known as TMP 1220.

As noted in an article in Food Development Magazine (June 1981) entitled "Single Process For Milk Proteinate Isolates Casein And Whey Proteins", TMP total milk proteinate is made by a new process. Such new process effectively isolates all of the caseinate and whey protein fractions from milk as a single, undenatured and fully functional protein complex. Thus with the new process to produce TMP 1220, the serum is removed in an acidifcation technique with the balance of the product being known as TMP 1220.

The proportions of the protein factions are identical to those normally found in milk. With this new acidifcation technique, all of the protein from the milk is to be found in the resulting solid product, with the separated out serum having no protein.

Accordingly the proteinate to be found in the TMP product is superior to caseinates in nutritional quality and display superior functional properties when compared to caseinates in model system functional property evaluations. By virtue of this new process whey proteins can be interacted with casein and isoelectrically precipitate from skim milk in an undenatured and fully functional single protein complex.

The foregoing is to be contrasted with casein that is precipitated from skim milk by the traditional process wherein approximately 20% of the milk protein remains soluble in the whey.

A comparison of the properties of the resulting products (TMP as compared with Alanate) shows that the TMP has an emulsifying capacity of more than double the Alanate. The TMP also possesses superior whippability properties and foam stability.

Typical analyses of TMP total milk proteins show lactose, fat and ash contents which are very similar to the analyses of the casein counterparts. The proteinates combine the natural properties of whey protein and casein.

The TMP line is rich in lysine, methionine and cystine, three essential amino acids which are deficient in a number of other food proteins. The nutritional quality of TMP Total milk proteinates exceeds that of caseinates and any vegetable protein isolate.

It will be noted that the fourth component of the base mix as set forth hereinabove is lecithin which is a necessary ingredient to having both the Alanate and TMP in very water soluble form. Both the TMP and Alanate are subjected to a so-called instantizing process. Such process involves the continuous spraying of water onto particles of TMP and Alanate, followed by the additional of lecithin (in liquid form) together with the blowing of air through the mix in a aerating step. Such aerating step has the effect of drying the treated particles. The foregoing is achieved in a batch process.

A similar solubilizing or instantizing process is utilized with reference to the flavoring mix, with the foregoing result being that both the base mix and the flavoring mix are highly water soluble.

In view of the foregoing it can be seen that the base mix adds a significant quantity of protein to the final product (when mixed with the Flavoring) as well as adding viscosity and bulk.

While the composition of the base Mix will not vary, the composition of the flavoring will vary quite significantly in view of the various flavors involved. For instance, the flavoring can be of the dessert-type, such as chocolate, vanilla or pineapple apricot.

The flavoring will also be vegetable flavors such as corn, onion and tomato.

The chocolate, vanilla and pineapple apricot flavorings each include a non-dairy creamer and a carbohydrate source.

The preferred non-dairy creamer is known as Wiptreme 2320 (Wiptreme) and is manufactured by Beatrice Foods Co. of Beloit, Wisc. This product contains corn syrup solids, partially hydrogenated vegetable oils (coconut, soybean), mono and diglyercides, sodium caseinate, glyceryl-lacto esters of fatty acids and dipotassium phosphate.

In the chocolate flavoring there are various flavoring agents, such as cocoa, vanilla and other chocolate flavoring or flavor sources as will occur to those skilled in the art, depending on the final taste desired. A preferred chocolate Flavoring has the following compositions for a food, drink, etc. having a food value of 60 calories:

| 60 Calories | Weight (grams) |
|---|---|
| Wiptreme 2320 | 6.4 |
| Avicel RC-591 (Avicel) | 2.28 |
| Red Dutch Special Cocoa | 3.50 |
| Carrageenan CSW-2 | 0.35 |
| Aspartame | 0.18 |
| TSPP | 0.50 |
| DSP | 0.20 |

-continued

| 60 Calories | Weight (grams) |
|---|---|
| Lecithin | 0.292 |

Additional chocolate and vanilla Flavorings may be added, as desired.

TSPP (tetrasodium pyrophosphate), DSP (disodium phosphate) and Avicel are manufactured by FMC corporation. TSPP, DSP are setting agents, with DSP speeding up the action of TSPP. Avicel possesses microcrystalline cellulose to add fibre and body.

Carrageenan CSW-2 is a cold water soluble gum and is manufactured by Hercules, Inc.

The combination of the Base Mix (120 calories) and chocolate Flavoring (60 calories) can be formed into a drink, a shake, a pudding, an ice cream bar or hot cocoa in accordance with the following instructions:

| | |
|---|---|
| DRINK - SHAKER | (1) Pour 8 oz. of cold water into a shaker.<br>(2) Add Base Mix, then Flavoring.<br>(3) Shake for one minute or stir until dissolved. |
| BLENDER | (1) Pour 8 oz. of cold water into a blender.<br>(2) Add Base Mix, then Flavoring.<br>(3) Blend on low speed for one minute. |
| SHAKE - BLENDER | (1) Pour 6 oz. of cold water into a blender<br>(2) Add Base Mix, then Flavoring.<br>(3) Blend on low speed, adding three ice cubes one at a time.<br>(4) Blend on high speed for one minute. |
| PUDDING - BLENDER | (1) Pour 4 oz. of cold water into a blender<br>(2) Add Base Mix, then Flavoring.<br>(3) Blend on high speed for one minute. |
| ICE CREAM BAR - BLENDER | (1) Pour 4 oz. of cold water into a blender.<br>(2) Add Base Mix, then Flavoring.<br>(3) Blend on high speed for one minute.<br>(4) Freeze. |
| HOT COCOA IN A CUP OR MUG | (1) Add Base Mix and Flavoring to a cup or mug.<br>(2) Add 8 oz. of boiling water.<br>(3) Stir until dissolved. |

A preferred vanilla or pineapple apricot flavoring has the following compositions for a food, drink, etc. having a food value of 60 and 50 calories, respectively:

| Vanilla Flavoring-60 Calories | Weight (grams) |
|---|---|
| Wiptreme 2320 | 8.0 |
| Avicel RC-591 | 1.80 |
| Avicel CL-611 | 0.30 |
| Carrageenan CSW-2 | 0.35 |
| APM | 0.12 |
| TSPP | 0.50 |
| DSP | 0.20 |
| Color Shade R | 0.0004 |
| Lecithin | 0.252 |
| Vanilla Flavorings as desired. | |
| Pineapple Apricot Flavoring-50 Calories | Weight (grams) |
| Wiptreme 2320 | 8.0 |
| Avicel RC-591 | 1.80 |
| Avicel CL-611 | 0.10 |
| Carrageenan CSW-2 | 0.35 |
| APM | 0.08 |
| TSPP | 0.50 |

| Vanilla Flavoring-60 Calories | Weight (grams) |
|---|---|
| DSP | 0.20 |
| FD & C Yellow #5 | 0.0044 |
| FD & C Yellow #6 | 0.0051 |
| Lecithin | 0.23 |
| Pineapple Apricot Flavorings as desired. | |

Directions for use to achieve a pineapple apricot or vanilla product are essentially the same as the instructions for the chocolate product as set forth hereinabove. It is contemplated that with the aforesaid flavors, a drink, shake, pudding or ice cream bar will be the final product. The drink in the case of a Vanilla or Pineapple Apricot Flavoring will be cold or of the frozen type only. See the instructions hereinabove to the headings Drink-Shaker, Blender, Shake-Blender, Pudding-Blender and Ice Cream Bar-Blender. Furthermore, other products having different textures such as sherbets can be produced. For a sherbet the preparation protocol involves the first step of pouring 4 oz. of cold water into a blender. Then, base mix is added, followed by the flavoring. The blender is then turned to high speed and blending action proceeds for one minute. The contents are then frozen to produce a frozen bar. Finally, the frozen bar is placed in the blender which is turned on to low speed until sherbet consistency is achieved.

Another aspect of the invention involves a Fruit Punch Mix and Lemon Drink Mix which are used to supplement potassium to the weight loss program. A total of six drinks may be taken per day.

The Fruit Punch Mix provides 6 calories and contains the following:

| 6 Calories | | |
|---|---|---|
| Citric Acid | 1.40 grams | ±20% Affects flavor |
| Potassium Citrate | 0.34 | ±20% Affects flavor |
| Cherry, Strawberry and Fruit Punch Flavors | 0.48 | ±20% Affects flavor |
| Aspartame | 0.114 | ±20% Affects flavor |
| Red #40 | 0.004 | ±20% Affects color |

The Lemon Drink Mix provides 6 calories and contains the following:

| 6 Calories | | |
|---|---|---|
| Citric Acid | 1.47 | ±20% Affects flavor |
| Potassium Citrate | 0.34 | ±20% Affects flavor |
| Lemon Flavor | 0.29 | ±20% Affects flavor |
| Lemon Juice | 0.10 | ±20% Affects flavor |
| Aspartame | 0.08 | ±20% Affects flavor |
| FD & C Yellow #5 | 0.0002 | ±20% Affects color |

The Flavoring for Corn (soup or souffle) has the following composition in terms of grams:

| 60 Calories | | |
|---|---|---|
| Corn Powder | 8.00 | ±30% Affects flavor |
| NDX-112V | 2.70 | ±20% Affects mouthfeel |
| Avicel RC-591 | 1.10 | ±20% Affects mouthfeel |
| Salt | 1.00 | ±20% Affects flavor |
| Butter Buds | 1.00 | ±20% Affects flavor |
| Yeast-Special Light | 0.80 | ±20% Affects flavor |
| Sugar | 0.75 | ±20% Affects flavor |
| Super 3H | 0.60 | ±20% Affects flavor |
| Guar Gum | 0.30 | ±20% Affects mouthfeel and consistency |
| Sol-E Celery | 0.10 | ±20% Affects flavor |
| Sol-E Onion | 0.06 | ±20% Affects flavor |
| Pepper-Ground White | 0.04 | ±20% Affects flavor |
| FD & C Yellow #5 | 0.006 | ±20% Affects color |

The flavoring for Onion (soup, dip or salad dressing) has the following composition in terms of grams:

| 50 Calories | | |
|---|---|---|
| Wiptreme 2320 | 7.00 | ±20% Affects mouthfeel and consistency |
| Avicel RC-591 | 3.00 | ±20% Affects mouthfeel and consistency |
| TSPP | 2.10 | ±20% Affects setting |
| Sol-E Onion | 1.20 | ±20% Affects flavor |
| DSP | 1.00 | ±20% Affects setting |
| Onions-Freeze-Dried | 1.00 | ±20% Affects flavor |
| 4BE | 0.80 | ±20% Affects flavor |
| Onion Flavor | 0.60 | ±20% Affects flavor |
| Onions-French Chopped | 0.50 | ±20% Affects flavor |
| Salt | 0.50 | ±20% Affects flavor |
| RFB Flavor | 0.40 | ±20% Affects flavor |
| Guar Gum | 0.30 | ±20% Affects mouthfeel and consistency |
| Beef Flavor | 0.20 | ±20% Affects flavor |
| Garlic Powder | 0.06 | ±20% Affects flavor |
| Pepper-Ground White | 0.02 | ±20% Affects flavor |
| Color Shade R | 0.008 | ±20% Affects color |

The flavoring for Tomato (soup, dip or salad dressing) has the following composition in terms of grams:

| 50 Calories | | |
|---|---|---|
| Tomato Powder | 8.00 | ±30% Affects flavor and mouthfeel |
| NDX-112V | 2.80 | ±20% Affects mouthfeel |
| Salt | 1.50 | ±20% Affects flavor |
| Avicel RC-591 | 1.10 | ±20% Affects mouthfeel and consistency |
| Starch IF-131 | 0.80 | ±20% Affects mouthfeel and consistency |
| Sodium Citrate | 0.80 | ±15% Affects mouthfeel and appearance |
| Super 3H | 0.60 | ±25% Affects flavor |
| MSG | 0.50 | ±25% Affects flavor |
| Tomato Flavor | 0.30 | ±25% Affects flavor |
| Citric Acid | 0.25 | ±25% Affects flavor |
| CBH | 0.20 | ±25% Affects flavor |
| Guar Gum | 0.10 | ±20% Affects mouthfeel and consistency |
| Sol-E Onion | 0.09 | ±25% Affects flavor |
| Celery Salt | 0.05 | ±25% Affects flavor |
| Pepper-Ground White | 0.02 | ±25% Affects flavor |
| Color Shade R | 0.006 | ±20% Affects color |
| Red #40 | 0.004 | ±20% Affects color |

The vegetable flavorings in the form of soups, such as corn, onion and tomato are prepared by first adding the base Mix and the flavoring to a cup or mug. This is followed by adding 8 oz. (1 cup) of boiling water, then stirring until dissolved and well mixed.

The vegetable flavoring in the form of a souffle, such as corn, is prepared by first adding the base mix and flavoring to a bowl. This is followed with the addition of 4 oz. (½ cup) of boiling water and stirring until dissolved and well mixed. The mixture is then poured into a baking dish, followed by baking at 350° or 30 minutes.

The vegetable flavoring in the form of a dip such as onion and tomato is prepared by first pouring 4 oz. (½ cup) of cold water into a blender. This is followed with the addition of base mix and flavoring. Blend on high speed for one minute and chill before serving. Seasonings such as chili powder or taco seasoning may be added before blending to the tomato mixture for variation.

The vegetable flavoring in the form of salad dressing such as onion and tomato is prepared by first pouring 4 or 5 oz. of cold water and 1 or 1½ Tbsp. of vinegar into a blender (the lesser quantities are for onion and the greater quantities are for tomato). Then base mix and flavoring is added along with ½ packet of Equal TM. Blend on high speed for one minute and chill before serving. Taco seasoning may be added before blending to the tomato mixture for variation.

The following is a list of the 170–180 calorie versions of the great variety of possible finished products:

| 170–180 Calories | |
|---|---|
| VEGETABLE | |
| Corn | Soup |
| Onion | Souffle |
| Tomato | Dip |
| | Salad Dressing |
| DESSERT | |
| Chocolate | Drink |
| Vanilla | Shake |
| Pineapple Apricot | Pudding |
| | Ice Cream Bar |
| | Hot (Cocoa) |
| | Sherbet |

It is contemplated in a particular plan that the foregoing will be taken four times each day so that the daily caloric intake will be between 680 calories or 720 calories per day.

The proportions by weight of the base mix to the flavoring mix will generally vary from ten to one to one to ten. In the final product the base mix and and flavoring mix together provide a significant amount of protein (15–17 grams of protein in a combined 44–50 grams of base mix and flavoring mix). The viscosity of the final product will vary depending upon the amount of water being added. In a flavored drink the viscosity will be similar to that of milk whereas with a milk shake the viscosity will be somewhat higher as the thickening effect of the two components will not be diluted away because of the use of smaller amount of water and any ice added will contribute body. Obviously with a soup, souffle, dip or salad dressing even lesser amounts of water are used to achieve a thicker and more viscous mass.

In each product, whether it be a dessert or vegetable, the amount of base mix added affects the consistency of the end product, the amount may be increased 205 and decreased 30% without significant difference.

In specific terms of ingredients, it is possible with reference to the chocolate and vanilla flavoring drinks, etc. to vary in the base mix, the thickening and flavoring function of RT-34 ±50% depending on the desired degree of thickness or thinness of the final product.

TMP 1220 can be varied in the base mix up to an increase of 50% or a decrease of 30%. Since TMP 1220 is present to add thickness and "set" it follows that where one uses a greater amount of TMP 1220 a thicker and more "set" product will result, with lesser effects being observed for lesser amounts of TMP 1220.

Alanate 230 may be varied in the same manner as TMP 1220 for desserts. Lecithin may only be increased 0.25% from the amount 0.0165 grams. Decreasing the amount would destroy the instant properties of the proteins.

With the soups, there is a somewhat smaller preferred variation in the four major ingredients of the Base Mix since here, each ingredient can be varied as much as +20% or −30%. Lecithin may only be increased 0.25%.

As to variations in the flavorings desserts, Wiptreme 2320 can be varied ±50%. Greater amounts of Wiptreme 2320 will make for higher consistency and lower amounts make for a lower consistency of the final product. Both Avicel RC-591 and Avicel CL-611 can be varied ±20% which will effect consistency and mouthfeel. The aspartame component can be varied ±20%, depending upon the desired effect on flavor.

Carrageenan CSW-2 can be varied ±30% as affecting thickness and setting properties. TSPP and DSP can be varied ±20% from the stated amounts to affect respectively "set" and time necessary for product to "set".

Also, the amount of water is varied depending on the desired consistency of the final product.

It should be kept in mind that an important principle of this invention is in the ability to combine the base mix with a flavoring. When it is desired to prepare a particular food, 32.6165 grams of the base mix are placed in a container together with the contents of a flavoring packet. Preparation of the food is then completed by adding water, stirring, etc. with heating or chilling, depending upon the desired end product.

With reference to the base mix, it is contemplated that there can be various substitutions of protein containing materials, such that the invention can be regarded as involving a Base Mix having at least one protein containing ingredient, although the three protein containing ingredients specified herein are preferred. In this connection one skilled in the art will be aware of other protein containing ingredients which can be substituted for the preferred composition set forth herein or in some cases only, one or two protein containing materials will be used, with or without the stated thickening or other effects as described hereinabove.

The ratio of components in yet another embodiment of the invention (New Program Mix) is different from the previously disclosed embodiments hereinabove. The earlier embodiments of this invention are comprised of four servings per day totaling Program), involves six servings per day totaling 690–720 calories. One New Program Base Mix packet provides 70 calories as opposed to 120 calories for the embodiments previously disclosed herein.

The New Program Formulas are as follows:

| | |
|---|---|
| New Program Lemon Drink Mix: Same as with earlier embodiments of invention. | |
| New Program Fruit Punch Drink Mix: Same as with earlier embodiments of invention. | |
| New Program Base Mix: 70 Calories | |
| 14.00 | Grams RT-34 Instant (referred to RT-34) |
| 2.20 | Grams Alanate 230 |
| 2.20 | Grams TMP 1220 |
| 0.011 | Grams Lecithin M-C Thin Asol #436 (referred to lecithin) |
| New Program Chocolate Flavoring Mix: 45 Calories | |
| 5.31 | Grams Wiptreme 2320 |
| 2.75 | Grams Cocoa M-2 |
| 1.29 | Grams Avicel RC-591 |
| 0.60 | Grams Carrageenan CSW-2 |
| 0.28 | Grams TSPP |
| 0.11 | Grams DSP |

-continued

| | |
|---|---|
| 0.10 | Grams Aspartame |
| 0.20 | Grams Lecithin |

Additional Chocolate Flavorings may be added, as desired.

New Program Vanilla Flavoring Mix: 45 Calories

| | |
|---|---|
| 6.20 | Grams Wiptreme 2320 |
| 1.02 | Grams Avicel RC-591 |
| 0.55 | Grams Carrageenan CSW-2 |
| 0.28 | Grams TSPP |
| 0.17 | Grams Avicel CL-611 |
| 0.11 | Grams DSP |
| 0.07 | Grams Aspartame |
| 0.20 | Grams Lecithin |

Additional Vanilla Flavorings may be added, as desired.

New Program Mocha Flavoring Mix: 45 Calories

| | |
|---|---|
| 5.80 | Grams Wiptreme 2320 |
| 1.02 | Grams Avicel RC-591 |
| 1.00 | Grams Cocoa M-2 |
| 0.45 | Grams Carrageenan CSW-2 |
| 0.28 | Grams TSPP |
| 0.17 | Grams Avicel CL-611 |
| 0.11 | Grams DSP |
| 0.055 | Grams Aspartame |
| 0.20 | Grams Lecithin |

Additional Coffee Flavorings may be added, as desired.

New Program Nacho Cheese Flavoring Mix: 50 Calories

| | |
|---|---|
| 4.00 | Grams Cheese Powder |
| 1.00 | Grams Wiptreme 2320 |
| 2.00 | Grams Avicel CL-611 |
| 2.00 | Grams Starch |
| 0.50 | Grams TSPP |
| 0.20 | Grams DSP |
| 0.30 | Grams Yeast |
| 0.20 | Grams Salt |
| 0.08 | Grams Citric Acid |
| 0.255 | Grams Spices |
| 0.261 | Grams Lecithin |
| 0.0044 | Grams Yellow #5 FD & C |
| 0.0003 | Grams Yellow #6 FD & C |

Additional Cheese and Butter Flavorings may be added, as desired.

New Program Tomato Flavoring Mix: 45 Calories

| | |
|---|---|
| 6.17 | Grams Tomato Powder |
| 2.16 | Grams NDX-112V |
| 1.00 | Grams Fructose |
| 1.16 | Grams Salt |
| 0.85 | Grams Avicel RC-591 |
| 0.62 | Grams Starch |
| 0.62 | Grams Sodium Citrate |
| 0.46 | Grams Super 3H |
| 0.39 | Grams MSG |
| 0.19 | Grams Citric Acid |
| 0.15 | Grams CBH |
| 0.08 | Grams Guar Gum |
| 0.07 | Grams Sol-E Onion |
| 0.04 | Grams Celery Salt |
| 0.015 | Grams Pepper-Ground White |
| 0.009 | Grams Color Shade R |
| 0.007 | Grams Red #40 |

Additional Tomato Flavorings may be added, as desired.

New Program Cream of Mushroom Flavoring Mix:

| | |
|---|---|
| 3.00 | Grams NDX-112V |
| 2.00 | Grams Avicel RC-591 |
| 2.40 | Grams Lodex 10 |
| 2.00 | Grams Starch |
| 0.25 | Grams Guar Gum |
| 0.34 | Grams RFB |
| 0.67 | Grams 4BE |
| 0.27 | Grams MF Flavor |
| 0.20 | Grams Salt |
| 0.05 | Grams Baking Soda |
| 0.50 | Grams Mushroom Pieces |

Additional Mushroom and Butter Flavorings may be added, as desired.

Mixing instructions for the products in their various forms are given below:

New Program Fruit Punch and Lemon Drink Mixes

| | |
|---|---|
| DRINKS | (1) Add flavoring mix to a glass. |
| | (2) Pour 8 oz. (1 cup) of cold water. |
| | (3) Stir until dissolved. |

New Program Vanilla, Chocolate and Mocha Flavoring Mixes

| | |
|---|---|
| DRINKS | (1) Add base mix, then flavoring mix into a glass. |
| | (2) Pour in 6 oz. (¾ cup) of cold water. |
| | (3) Stir until dissolved. |
| | OR |
| | (1) Pour 6 oz. (¾ cup) of cold water into a blender. |
| | (2) Add base mix, then flavoring mix. |
| | (3) Blend on low speed for 30 seconds. |
| SHAKE | (1) Pour 4 oz. (½ cup) of cold water into a blender. |
| | (2) Add base mix, then flavoring mix. |
| | (3) Blend on low speed, adding 2 ice cubes one at a time. |
| | (4) Blend on high speed for 1 minute. |
| PUDDING | (1) Pour 3 oz. (⅓ cup) of cold water into a blender. |
| | (2) Add base mix, then flavoring mix. |
| | (3) Blend on high speed for 1 minute. |
| FROZEN DESSERT BAR | (1) Pour 3 oz. (⅓ cup) of cold water into a blender. |
| | (2) Add base mix, then flavoring mix. |
| | (3) Blend on high speed for 1 minute. |
| | (4) Freeze. |
| HOT DRINK (For Chocolate and Mocha Only) | (1) Add base mix, then flavoring mix to a cup or mug. |
| | (2) Add 6 oz. (¾ cup) of boiling water. |
| | (3) Stir until dissolved. |

New Program Nacho Cheese Flavoring Mix

| | |
|---|---|
| SOUP | (1) Add base mix, then flavoring mix to a cup or mug. |
| | (2) Add 5 oz. (⅔ cup) of boiling water. |
| | (3) Stir until dissolved. |
| DIP | (1) Pour 3 oz. (⅓ cup) of cold water into a blender. |
| | (2) Add base mix, then flavoring mix. |
| | (3) Blend on high speed for 1 minute. |
| | (4) Chill before serving. |
| SOUFFLE | (1) Add base mix, then flavoring mix to a bowl. |
| | (2) Add 3 oz. (⅓ cup) of boiling water. |
| | (3) Stir until dissolved. |
| | (4) Pour mixture into a 6 oz. oven-proof custard cup or dessert dish and bake at 350° F. for 30 minutes. |

New Program Tomato Flavoring Mix

| | |
|---|---|
| SOUP | (1) Add base mix, then flavoring mix to a cup or mug. |
| | (2) Add 5 oz. (⅔ cup) of boiling water. |
| | (3) Stir until dissolved. |
| DIP | (1) Pour 3 oz. (⅓ cup) of cold water into a blender. |
| | (2) Add base mix, then flavoring mix. |
| | (3) Blend on high speed for 1 minute. |
| | (4) Chill before serving. |

*Variations*

| | |
|---|---|
| Chili Dip | Add ⅛-¼ teaspoon of chili powder before blending. |
| Mexican Dip | Add ¼ teaspoon of taco seasoning mix before blending. |
| SALAD DRESSING | (1) Pour 4 oz. (½ cup) of cold water 1 tablespoon of vinegar into a blender. |
| | (2) Add base mix, then flavoring mix and ¼ packet of Equal ™ (Aspartame). |
| | (3) Blend on high speed for 1 minute. |
| | (4) Chill before serving. |

*Variations*

| | |
|---|---|
| Taco Dressing | Add ¼ teaspoon of taco seasoning mix before blending. |

New Program Cream of Mushroom

| | |
|---|---|
| SOUP | (1) Add base mix, then flavoring Mix to a cup or mug. |
| | (2) Add 5 oz. (⅔ cup) of boiling water. |
| | (3) Stir until dissolved. |
| SOUFFLE | (1) Add base mix, then flavoring Mix to a bowl. |
| | (2) Add 3 oz. (⅓ cup) of boiling water. |
| | (3) Stir until dissolved. |
| | (4) Pour mixture into a 6 oz. oven-proof | custard cup or dessert dish and bake at 350° F. for 30 minutes.

The span of variation that is acceptable in the New Program formulas is approximately 66% (+) and (−) that of the formulas of the earlier disclosed embodiments.

Without further elaboration, the foregoing will so fully illustrate my invention that others may, by applying current or future knowledge, readily adopt the same for use under various conditions of service.

I claim:

1. A comprehensive and versatile nutritional composition suitable for making varieties of food products including hot and cold drink, shakes, puddings, frozen bars, soups, salad dressings, dips, souffles and vegetables, said composition, comprising a separately maintained base mix and a separately maintained flavoring mix with an amount of said base mix being sufficient to provide an adequate amount of proteins, for a low calorie diet, said base mix including at least one dairy based constituent to provide bulk and flavor and further comprising a whey protein concentrate and at least one caseinate product having a low flavor profile, said flavoring mix including at least one flavoring agent said base mix or flavoring mix or both having thickening properties with said base mix and flavoring mix being highly water soluble and said base mix and flavoring mix being brought together in the presence of a sufficient quantity of water just prior to use, said varieties of food products being dependent upon the flavoring agent, amount of water, temperature and method of making.

2. The comprehensive nutritional composition of claim 1 wherein said base mix includes a major amount of a whey protein concentrate and minor amounts of a calcium sodium caseinate and a calcium sodium total milk proteinate.

3. The comprehensive nutritional composition of claim 2 wherein said base mix also includes lecithin, a surfactant.

4. The comprehensive nutritional composition of claim 1 wherein said flavoring includes a non-dairy creamer.

5. The comprehensive nutritional system of claim 4 wherein said flavoring mix includes a carbohydrate source.

6. The comprehensive nutritional composition of claim 5 wherein said flavoring mix includes at least one flavoring agent.

7. The comprehensive nutritional composition of claim 6 wherein said flavoring mix agent comprises a source of chocolate flavor.

8. The comprehensive nutritional composition of claim 6 wherein said flavoring agent comprises a source of vanilla flavor.

9. The comprehensive nutritional composition of claim 6 wherein said flavoring agent comprises a pineapple apricot flavor.

10. The comprehensive nutritional composition of claim 1 wherein said flavoring includes a corn flavoring.

11. The comprehensive nutritional composition of claim 1 wherein said flavoring includes onion flavoring.

12. The comprehensive nutritional composition of claim 1 wherein said flavoring includes tomato flavoring.

* * * * *